Feb. 25, 1941.                C. L. KELLER                2,233,081
              LIQUID LEVEL CONTROL DEVICE FOR STORAGE BATTERIES
                           Filed June 1, 1939

INVENTOR.
CHARLES L. KELLER.
BY Allen & Allen
ATTORNEYS.

Patented Feb. 25, 1941

2,233,081

UNITED STATES PATENT OFFICE 2,233,081

LIQUID LEVEL CONTROL DEVICE FOR STORAGE BATTERIES

Charles L. Keller, Cincinnati, Ohio, assignor to The Richardson Company, a corporation of Ohio Application June 1, 1939, Serial No. 276,826

13 Claims. (Cl. 136—178)

My invention relates to the problem of providing means in a storage battery to prevent overfilling, thus insuring an adequate space for gas collection over the electrolyte, which space however, is vented at the top when the battery is in use so that the collected gases may escape. Various types for the purpose have been suggested. These devices in general contemplate a tube-like member extending downwardly from the top of the cell cover to the proper electrolyte level, this tube-like member providing a means whereby the battery may be filled, and a filling cap being also provided. The space within the cell cover, that is to say, the gas collection space, is arranged to be closed to the atmosphere when the filling cap is off; but provision is made for venting the gas collection space to the atmosphere when the filler cap is in closed position. Numerous devices employing this general principal have been provided; but they have presented certain difficulties. Many of them have been complicated in design and construction and therefore expensive, frequently requiring a complete redesign of the cell cover. Others in the form of special fittings have been cumbersome or complicated or non-positive in action, or have relied on resilient means for operation, which means cannot be depended upon to retain permanent resilience. Many of those hitherto suggested have neither been replaceable nor has it been possible to install them in batteries already built up, without disassembling the battery.

The principal objects of my invention may be summarized as follows:

To provide control means of positive action but of insignificant cost.

To provide control means which do not require expensive or complicated re-designing of the cell cover, and which do not increase the cost of the cell cover.

To provide control means which may be replaced in storage batteries without disassembling the battery.

To provide control means which are proof against defect and failure and which are not liable to be rendered ineffective by mischance.

These and other objects of my invention which will be set forth hereinafter, or will be apparent to one skilled in the art upon reading these specifications, I accomplish by that certain construction and arrangement of parts of which I shall now describe certain exemplary embodiments. Reference is made to the accompanying drawing wherein.

Briefly, in the practice of my invention, I employ the usual type of cell cover having the usual type of filler opening excepting that from the base of the filler opening a tube-like member extends downwardly to the desired liquid level. If the storage battery is not filled beyond the lower end of this tube, adequate gas collection space will be provided above the electrolyte level. The downwardly extending tube-like portion is of smaller diameter than the maximum diameter of the filler opening, thus leaving a shoulder. This shoulder is perforated to provide a vent for the gas collection space. Within the filler opening and resting upon this shoulder so as to close the perforation, I provide a valve member of sufficient mass to act as a valve for the perforation; and I provide in connection with the filler cap a construction of parts whereby when the filler cap is in place, the valve member will be lifted from the perforation, all as I shall hereinafter more fully describe in preferred embodiments.

Figure 1:
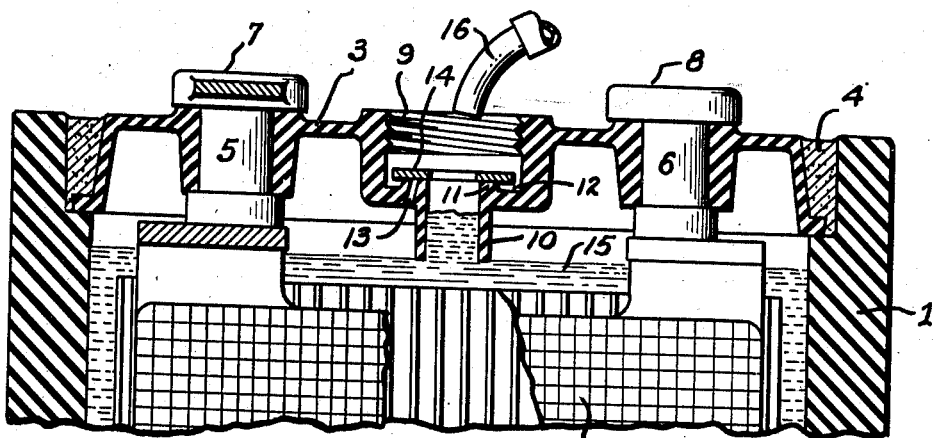
Figure 1 is a sectional view taken vertically through the upper part of a cell of a storage battery showing one embodiment of my device in operation with the filler cap removed.

In Fig. 1, I indicates the walls of a storage battery cell having the usual plate assembly indicated generally at 2. The usual cover 3 is employed, sealed within the walls of the cell by the sealing compound 4, the terminal posts 5 and 6 of the plate assembly extend through the usual perforations in the cell cover, and are provided with connector members 7 and 8, or with the usual terminals. A threaded vent opening 9 is provided as usual in the cell cover. The portions of the cell cover surrounding the vent opening are provided with a downwardly extending tube-like member 10, preferably though not necessarily integral with the material of the cell cover. This tube-like extension is of smaller diameter than the filler opening 9 so as to leave a shoulder 11 within the filler opening. In the embodiment of my device shown in Fig. 1 there is an annular groove 12 lying outside the shoulder for a purpose which will hereinafter be made apparent. The shoulder 11 is provided with one or more vent perforations 13. I prefer to provide a plurality of these perforations around the shoulder 11. A washer-like member 14 lies within the filler opening and rests upon the shoulder 11. This member constitutes a weight operated valve. It may be formed of any suitable acid resistant substance, such as a moulding compound, hard rubber or the like; but I prefer to give it more mass than can usually be obtained from materials of this class. Thus, while my invention is not so limited, in commercial practice I make a valve member 14 in the form of an annular, centrally perforated washer of antimonial lead, by which I mean an alloy of lead and antimony containing sufficient of the latter metal to render it inert under normal conditions to the storage battery electrolyte.

In Fig. 1, I have shown the structure with the filler cap removed. The electrolyte 15 may be replenished by introducing a liquid into the cell through the filler opening, the hole in the washer 14 and the tube 10. I have indicated filler means at 16. Since the washer 14 acts as a valve and closes the top of the perforation or perforations 13 the cell can only be filled to the level of the lower end of the tube-like extension 10. When the electrolite has reached this level, the addition of a further quantity of liquid will cause the liquid to rise rapidly in the tube 10, thus giving to the operator an indication that the cell is being overfilled.

To operate as I have indicated, it is only necessary that the washer or valve member 14 have sufficient mass to counteract the weight of the relatively very small column of liquid in the tube-like extension 10. This weight is very small, as will be appreciated. The efficacy of the valve action is enhanced by the fact that the washer 14 and shoulder will normally be moist. It is, however, not necessary that the valve action make an absolutely air-tight closure, since the liquid level will rise rapidly in the tube-like extension 10 in spite of slight air leakage, thus giving to the operator the required signal.

Figure 2:
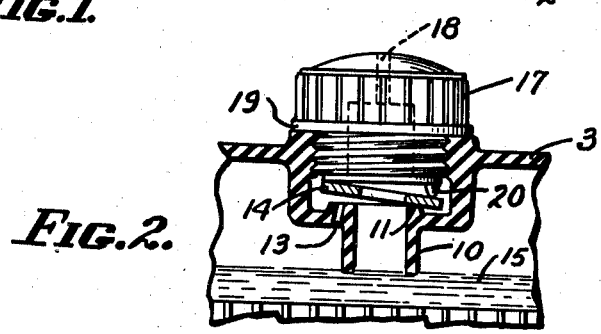
Fig. 2 is a fragmentary sectional view showing the disposition of the parts when the filler cap is in place.

In Fig. 2 I have shown the structure when the filler cap 17 is in place. This filler cap may have any current construction in the art. It is, of course, hollow within, is usually supplied with a splash washer (not shown), and has a gas vent 18. The filler cap has a threaded portion to engage the threads of the filler opening 9, or may be provided with other means to hold it in place. Usually, also, it has a sealing washer 19. The lower annular extension of the filler cap is provided with a protuberance 20 at one side. This is of such a length that when a filler cap is put in position to close the filler opening, the washer 14 will be tilted as shown in Fig. 2 so as to raise one side of it off of one or more of the perforations 13. The side of the washer 14 which is depressed goes down into the annular groove 12. If a series of perforations are arranged around the shoulder 11 any tilting of the washer will serve to uncover one or more of the perforations. It will be apparent also that gas will be vented from the interior of the cell through the perforation or perforations 13, past the washer 14 and through the gas vent opening of the filler plug 17.

My construction will thus be seen to be very simple. It is also perfectly safe since even if the filler cap should become so mutilated as not to tilt the washer, yet any excess pressure of gas within the cell will escape by raising the washer, or around the end of the tube-like extension 10. My device prevents overfilling of the storage battery so that no appreciable amount of electrolyte could be expelled from the storage battery by gas actions under normal conditions.

Figure 3:
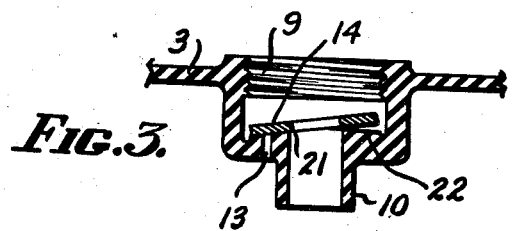
Fig. 3 is a fragmentary sectional view showing another form of my invention with the filler cap removed.
Figure 4:
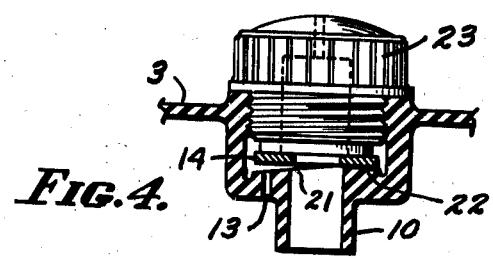
Fig. 4 is a fragmentary sectional view showing the disposition of the parts when the filler cap is in place.

In Figs. 3 and 4 I have shown a filling construction which permits the use of a filler cap without a projection thereon. Here I employ the same filler opening 9 and the same tube-like extension 10, which again is smaller than the internal diameter of the filler opening, leaving a shoulder or shelf within that opening as will be clear. The greater part of the surface of this shelf is moulded or machined so as to lie aslant to the general plane of the top of the cell cover as shown at 21. A smaller portion of the shoulder or shelf, indicated at 22 is, however, moulded or machined so as to be either parallel with the top of the cell cover or slanting slightly in the opposite direction. The shelf, therefore, is so formed as to provide a fulcrum on which the washer 14 may rock. The first mentioned slanting portion of the shelf is provided with the perforation 13 or a series of such perforations. As shown in Fig. 4, when the filler cap 23 is in place the lower end of the filler cap contacts the washer 14, rocks it on the fulcrum aforementioned, and raises it from the perforation or perforations 13. The slanting portion of the shelf which bears the perforations 13 forms the larger portion of the shelf, so that when the filler cap is removed as in Fig. 3, the washer 14 by gravity will always rest against the portion of the shelf which bears the perforations.

The washers 14 as I have indicated, are centrally perforated. They may have quite a loose fit in the filler openings 9, so long as the width of the annular solid portion of the washer is such that this solid portion cannot uncover the perforations by movement in its plane. If anything happens to a washer, if it becomes bent or if it is lost, it is readily replaceable as will be clear. The operation of my device has been proved to be effective and positive in service, yet the cost of it is not significant as compared with ordinary cell covers.

Modifications may be made in my invention without departing from the spirit of it.

Having thus described my invention what I claim as new and desire to secure by Letters Patent, is:

1. In a cell cover a body having a filler opening, walls depending from said body around said filler opening, and a downward tubular extension from said side walls of lesser periphery than the interior periphery of said walls whereby a shoulder is left within said walls and about the opening of said tubular extension, said tubular extension depending from said cell cover to a distance such that its lower end determines the proper electrolyte level, said shoulder shaped to provide a fulcrum and having a perforation exterior to said tubular extension for venting gases, and a member in the form of a flat annulus within said filler opening and resting on said shoulder so as to close said perforations excepting when lifted therefrom, said member shaped to permit filling through said tubular extension, a vented filler cap for said filler opening, and means on said filler cap for tilting said last mentioned member on said fulcrum away from said perforation.

2. In a cell cover a body having a filler opening, a hollow annular portion of said body extending downwardly from the top thereof about said filler opening, a further tube-like extension of lesser periphery than said body portion whereby a shoulder is left within said filler opening and above said tube-like extension, a perforation in said shoulder exterior to said tube-like extension for venting gases, a washer shaped valve resting on said shoulder and closing said perforation, said shoulder terminating outwardly in an annular groove, a vented filler cap, and means on said filler cap for tilting said washer so as to cause one side of it to enter said groove.

3. In a cell cover a body having a filler opening, a hollow annular portion of said body extending downwardly from the top thereof about said filler opening, a further tube-like extension of lesser periphery than said body portion whereby a shoulder is left within said filler opening and above said tube-like extension, a perforation in said shoulder exterior to said tube-like extension for venting gases, a flat annular valve resting on said shoulder and closing said perforation, a vented filler cap and means on said filler cap for tilting said member away from said perforation, one portion of said shoulder being formed aslant in one direction and the other portion of said shoulder lying at an angle thereto whereby to form a fulcrum for said valve, said portions being of unequal area, said perforation lying in the portion of larger area upon which said valve normally rests, whereby when said means on said filler cap contacts said valve, said valve will be tilted away from said larger area portion of said shoulder.

4. A storage battery cell cover having a well as a filler opening, said well having an interior, annular shoulder, a hollow tube-like portion extending downwardly from said shoulder and open to said well, at least one perforation through said shoulder to a point exterior to said tube-like portion, a weight-controlled valve member in said well capable of resting on said shoulder so as to cover said perforation and having a central opening giving access to the hollow of said tube-like portion, vented means for closing said filler opening, said shoulder having an outlying groove, and said closure means having means for tilting said weight-controlled valve member by depressing a portion thereof into said groove.

5. A storage battery cell cover having a well as a filler opening, said well having an interior, annular shoulder, a hollow tube-like portion extending downwardly from said shoulder and open to said well, at least one perforation through said shoulder to a point exterior to said tube-like portion, a weight-controlled valve member comprising a flat annulus in said well capable of resting on said shoulder so as to cover said perforation and having a central opening giving access to the hollow of said tube like portion, vented means for closing said filler opening, said shoulder having a greater area containing said perforation in one plane and a lesser unperforated area in another plane whereby a fulcrum is provided for said valve member, and said closure means having means for tilting said weight-controlled valve member by depressing a portion thereof toward said lesser area.

6. A storage battery cell cover having a well as a filler opening, said well having an interior, annular shoulder, a hollow tube-like portion extending downwardly from said shoulder and open to said well, at least one perforation through said shoulder to a point exterior to said tube-like portion, a weight-controlled valve member comprising a flat annulus in said well capable of resting on said shoulder so as to cover said perforation and having a central opening giving access to the hollow of said tube-like portion, vented means for closing said filler opening, said last mentioned means having a portion for contacting and moving said weight controlled valve member whereby to uncover said perforation, said shoulder having a greater area containing said perforation in a plane aslant to the contacting portion of said closure means, and a lesser unperforated area in another plane whereby to provide a fulcrum for said valve member, said closure means acting when in closing position to tilt said weight controlled valve member by depressing a portion thereof toward said lesser area.

7. In a storage battery cell cover, a body having a filler opening, walls depending from said body around said filler opening, and a downward tubular extension from said walls of lesser periphery than the interior periphery of said walls whereby a shoulder is left within said walls about the opening of said tubular extension, said tubular extension depending to a distance such that its lower end may determine the proper electrolyte level in a storage battery, and said shoulder being formed with a portion in one plane adapted to serve as a valve seat and having a perforation in said portion through said shoulder and exterior to said tubular extension, said shoulder having another portion of smaller area in a different plane whereby to provide a fulcrum so that a valve member in the form of a flat annulus resting on said first mentioned portion of said shoulder may be tilted away from said shoulder by pressure against a portion thereof overlying said second mentioned shoulder portion.

8. A cell cover as set forth in claim 7 in which said first mentioned shoulder portion is an annular portion surrounding the upper end of said tubular extension and in which said second mentioned shoulder portion is an outlying annular portion disposed at a lower level.

9. A cell cover as set forth in claim 7 in which said first mentioned shoulder portion is an annular portion surrounding the upper end of said tubular extension and in which said second mentioned shoulder portion is an outlying annular portion disposed at a lower level in combination with a vented filler cap for closing said filler opening, said filler cap being movable and having means thereon for contacting a valve member when said filler cap is in closing position.

10. Apparatus as claimed in claim 7 in which said first mentioned shoulder portion comprises the greater part of the surface area of the entire shoulder and in which the second mentioned shoulder portion has a surface lying in a plane aslant to the plane of the first mentioned shoulder portion and located at one side of said shoulder.

11. Apparatus as claimed in claim 7 in which said first mentioned shoulder portion comprises the greater part of the surface area of the entire shoulder and in which the second mentioned shoulder portion has a surface lying in a plane aslant to the plane of the first mentioned shoulder portion and located at one side of said shoulder, in combination with a vented filler cap for closing said filler opening, said filler cap being movable and having means thereon for actuating a valve member when said filler cap is in covering position.

12. In a cell cover a body having a filler opening, a hollow annular portion of said body extending downwardly from the top thereof about said filler opening, a further tube-like extension of lesser periphery than said body portion whereby a shoulder is left within said filler opening and above said tube-like extension, a perforation in said shoulder exterior to said tube-like extension, a washer shaped valve resting on said shoulder and closing said perforation, a vented filler cap and means on said filler cap for tilting said member away from said perforation, said shoulder for the greater part of its area being formed aslant in one direction and the other portion of said shoulder lying at an angle thereto to form a fulcrum for said valve whereby when said filler cap contacts said valve, said valve will be tilted away from said first mentioned portion of said shoulder, said other portion of said shoulder being so disposed that said valve may be lifted from said first mentioned portion of said shoulder without being brought into conforming contact with said other portion of said shoulder, whereby to prevent sticking.

13. In a cell cover, a filler well having an inwardly extending annular portion at its bottom shaped to provide an annular shoulder and an outlying annular groove, a tubular part open through said filler well and adapted to depend therefrom to a desired maximum electrolyte level, a passageway between the exterior of said tubular part and said shoulder, a perforated valve part resting on said shoulder in passageway-closing position whereby said filler well and tubular part are caused to form a filler opening which is substantially gas tight from the bottom of said tubular part to the top of said well, said valve part having a portion extending beyond said annular shoulder, and being tiltable by pressure applied to said portion to open said passageway to permit escape of gas into said filler well at a point intermediate the bottom of said tubular part and the top of said filler well.

CHARLES L. KELLER.